US009740168B2

United States Patent
Sung et al.

(10) Patent No.: US 9,740,168 B2
(45) Date of Patent: *Aug. 22, 2017

(54) COMPLEX SPATIAL LIGHT MODULATOR AND 3D IMAGE DISPLAY INCLUDING THE SAME

(71) Applicants: SAMSUNG ELECTRONICS CO., LTD., Suwon-si (KR); KOREA UNIVERSITY RESEARCH AND BUSINESS FOUNDATION, Seoul (KR)

(72) Inventors: Gee-young Sung, Daegu (KR); Hwi Kim, Seoul (KR); Hoon Song, Yongin-si (KR); Kang-hee Won, Seoul (KR); Hong-seok Lee, Seongnam-si (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 735 days.

This patent is subject to a terminal disclaimer.

(21) Appl. No.: 14/167,754

(22) Filed: Jan. 29, 2014

(65) Prior Publication Data

US 2014/0210960 A1    Jul. 31, 2014

(30) Foreign Application Priority Data

Jan. 30, 2013  (KR) ........................ 10-2013-0010572

(51) Int. Cl.
*G02F 1/01*    (2006.01)
*G03H 1/22*    (2006.01)
(Continued)

(52) U.S. Cl.
CPC ........... *G03H 1/2286* (2013.01); *G02B 5/045* (2013.01); *G02B 5/1814* (2013.01);
(Continued)

(58) Field of Classification Search
None
See application file for complete search history.

(56) References Cited

U.S. PATENT DOCUMENTS

| 9,360,840 B2 * | 6/2016 | Won .................. G03H 1/2294 |
| 2010/0214634 A1 | 8/2010 | Kroll et al. |

(Continued)

FOREIGN PATENT DOCUMENTS

| JP | 06-265927 A | 9/1994 |
| JP | 2006-184447 A | 7/2006 |
| KR | 10-2014-0098010 A | 8/2014 |

OTHER PUBLICATIONS

Cao, et al.; "Design and Fabrication of a Polarization-Independent Wideband Transmission Fused-Silica Grating", Applied Optics, vol. 49, No. 21, Jul. 20, 2010, pp. 4108-4112.

(Continued)

*Primary Examiner* — Andy Rao
*Assistant Examiner* — Tyler Edwards
(74) *Attorney, Agent, or Firm* — Sughrue Mion, PLLC (57) ABSTRACT

A complex spatial light modulator and a three-dimensional (3D) image display apparatus including the complex spatial light modulator are provided. The complex spatial light modulator includes: a spatial light modulator that modulates a phase of light; a prism array including a plurality of prism units, each of the plurality of prism units including a first prism surface and second prism surface, where light from the spatial light modulator is incident on the prism array; and a polarization-independent diffracting element that diffracts light that has passed through the prism array.

20 Claims, 6 Drawing Sheets

(51) Int. Cl.
*G02F 1/1335* (2006.01)
*G02B 5/04* (2006.01)
*G02B 5/18* (2006.01)
*G02B 27/22* (2006.01)
*G03H 1/02* (2006.01)

(52) U.S. Cl.
CPC ... *G02B 27/2214* (2013.01); *G02F 1/133504* (2013.01); *G03H 1/02* (2013.01); *G03H 1/2294* (2013.01); *G03H 2001/0224* (2013.01); *G03H 2223/18* (2013.01); *G03H 2223/19* (2013.01); *G03H 2223/23* (2013.01); *G03H 2225/33* (2013.01); *G03H 2225/55* (2013.01)

(56) References Cited

U.S. PATENT DOCUMENTS

| | | |
|---|---|---|
| 2011/0149018 A1 | 6/2011 | Kroll et al. |
| 2012/0092735 A1 | 4/2012 | Futterer et al. |
| 2013/0335795 A1* | 12/2013 | Song .............. G03H 1/2294 359/9 |
| 2014/0118645 A1 | 5/2014 | Sung et al. |
| 2014/0210960 A1 | 7/2014 | Sung et al. |

OTHER PUBLICATIONS

Communication dated May 28, 2014, issued by the European Patent Office in counterpart European Application No. 14152136.9.

* cited by examiner

COMPLEX SPATIAL LIGHT MODULATOR AND 3D IMAGE DISPLAY INCLUDING THE SAME

CROSS-REFERENCE TO RELATED APPLICATION

This application claims priority from Korean Patent Application No. 10-2013-0010572, filed on Jan. 30, 2013, in the Korean Intellectual Property Office, the disclosure of which is incorporated herein in its entirety by reference.

BACKGROUND

1. Field

Apparatuses consistent with exemplary embodiments relate to complex spatial light modulators and three-dimensional (3D) image display apparatuses including the complex spatial light modulators.

2. Description of the Related Art

Recently, the release of three-dimensional (3D) movies is increasing, and accordingly, research into technology related to 3D image display apparatuses is increasing. A 3D image display apparatus displays a 3D image based on binocular parallax, and thus, 3D image display apparatuses that are currently commercialized use the principle of binocular parallax to allow viewers to perceive stereoscopy by respectively providing a left view image and a right view image, which differ in viewpoints, to a left eye and a right eye. Examples of the 3D image display apparatus include a glasses-type 3D image display apparatus, which requires particular glasses, and a no-glasses type 3D image display apparatus, which requires no glasses.

However, when viewing a 3D image displayed according to a binocular parallax method, eye fatigue is intense, and a 3D image display apparatus that provides only two viewpoints, that is, a left view image and a right view image, is not capable of reflecting changes in a viewpoint according to movement of the viewer, and thus it is limited in its ability to provide natural stereoscopy.

In order to display a more natural stereoscopic image, a holographic 3D image display apparatus is currently being researched. However, in order to implement a holographic 3D image display apparatus, a device that is capable of controlling not only amplitude but also phase of light is necessary. When an image is displayed by using a device that is capable of controlling only one of luminance (amplitude) and phase of light, image quality may be degraded by, for example, zero-order diffraction light, twin images, or speckles.

A holographic 3D image display apparatus may include a holographic optical element in order to control an amplitude of the light. However, such a device, for example, a Bragg grating, is composed of birefringent materials, and is therefore polarization-dependent. Thus, the use of such a holographic optical element also requires the use of a polarizer and a half-wave plate, or other polarizing optical elements in order for the amplitude of the light incident on the holographic optical element to be controlled. Such additional elements add to the complexity and cost of the device. Furthermore, the "radiation effect" problem of current holographic optical elements is known. The photopolymer function of current holographic optical elements degrades over time, causing the optical performance of the image display apparatus to decay over time. Such polarization-dependent optical elements are also expensive and difficult to manufacture and are limited in size.

SUMMARY

One or more exemplary embodiments may provide complex spatial light modulators that are capable of controlling both amplitude and phase of light.

One or more exemplary embodiments may provide holographic three-dimensional (3D) image display apparatuses including complex spatial light modulators that are capable of controlling both amplitude and phase of light and displaying a stereoscopic image.

Additional aspects and/or advantages will be set forth in part in the description which follows and, in part, will be apparent from the description, or may be learned by practice of the presented embodiments.

According to an aspect of an exemplary embodiment, a complex spatial light modulator includes: a spatial light modulator that modulates a phase of light; a prism array that is disposed next to the spatial light modulator, wherein a prism unit having a first prism surface and second prism surface is arranged in the prism array; and a polarization-independent diffracting element that diffracts light that has passed through the prism array.

The first prism surface and the second prism surface may be symmetrically arranged with respect to each other.

The first prism surface and the second prism surface may be disposed to face pixels of two lines of the spatial light modulator.

First light that is refracted at the first prism surface and second light that is refracted at the second prism surface may be combined along one optical axis by using the diffracting element.

The first prism surface and the second prism surface may be disposed to face each other, and the first prism surface and the second prism surface may have the same gradient with respect to a central line of the first prism surface and the second prism.

+1 order light that is formed by diffracting first light that is refracted at the first prism surface, by using the diffracting element, and −1 order light that is formed by diffracting second light that is refracted at the second prism surface, by using the diffracting element, may be combined.

The spatial light modulator may include a liquid crystal layer.

An interval between the prism array and the diffracting element may satisfy the following equation:

$$h = T/\tan\theta,$$

where h denotes the interval between the prism array and the diffracting element, T denotes a pitch of pixels of the spatial light modulator, and θ denotes an incident angle of light that is incident on the diffracting element.

The diffracting element may be a semiconductor diffracting element comprising an array of protrusions and grooves.

According to an aspect of another exemplary embodiment, a three-dimensional (3D) image display apparatus includes: a light source unit that emits light; a spatial light modulator that modulates a phase of the light emitted from the light source unit; an image signal circuit unit that inputs an image signal to the spatial light modulator; and a beam combiner that modulates phase and amplitude of light emitted from the spatial light modulator, wherein the beam combiner includes: a prism array that is disposed next to the spatial light modulator, wherein a prism unit having a first prism surface and second prism surface is arranged in the prism array; and a polarization-independent diffracting element that diffracts light that has passed through the prism array.

According to an aspect of another exemplary embodiment, a complex spatial light modulator includes: a spatial light modulator that modulates a phase of light transmitted therethrough; a prism array comprising an array of a plurality of prism units, wherein light from the spatial light modulator is incident on the prism array; and a semiconductor diffracting element comprising an array of protrusions and grooves, wherein, for each of the plurality of prism units, the diffracting element combines light transmitted through a first prism surface and light transmitted through a second prism surface to travel on a single optical axis.

According to an aspect of another exemplary embodiment, a three-dimensional (3D) image display apparatus, includes: a light source unit that emits light; a spatial light modulator that modulates a phase of light transmitted therethrough; a prism array comprising an array of a plurality of prism units, wherein light from the spatial light modulator is incident on the prism array; and a semiconductor diffracting element comprising an array of protrusions and grooves, wherein, for each of the plurality of prism units, the diffracting element combines light transmitted through a first prism surface and light transmitted through a second prism surface to travel on a single optical axis.

BRIEF DESCRIPTION OF THE DRAWINGS

These and/or other aspects and advantages will become apparent and more readily appreciated from the following description of exemplary embodiments, taken in conjunction with the accompanying drawings in which.

DETAILED DESCRIPTION

Reference will now be made in detail to exemplary embodiments, which are illustrated in the accompanying drawings, wherein in the drawings, the sizes or thicknesses of elements may be exaggerated for convenience of description, and like reference numerals refer to the like elements throughout. In this regard, the present embodiments may have different forms and should not be construed as being limited to the descriptions set forth herein. Accordingly, the exemplary embodiments are merely described below, by referring to the figures, to explain aspects of the present description.

Figure 1:
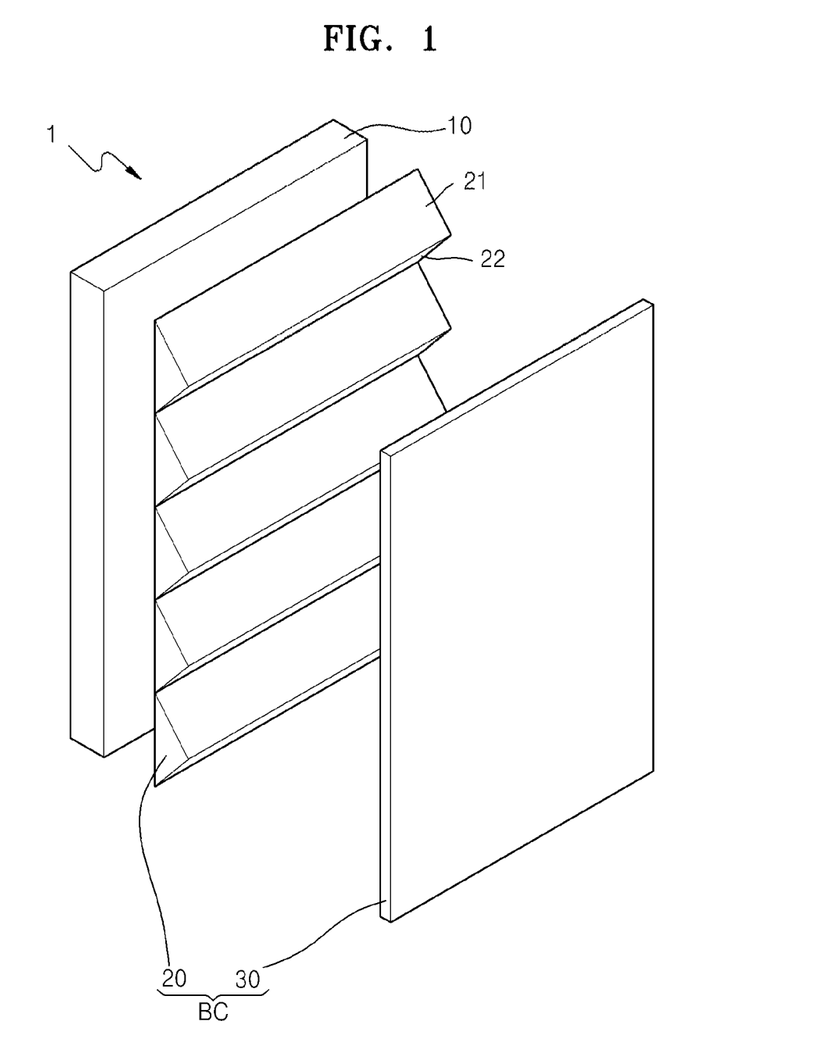
FIG. 1 is a perspective view of a complex spatial light modulator according to an exemplary embodiment.

FIG. 1 is a perspective view of a complex spatial light modulator 1 according to an exemplary embodiment. The complex spatial light modulator 1 may include a spatial light modulator 10 that modulates a phase of a beam and a beam combiner BC that combines beams emitted from the spatial light modulator 10. The beam combiner BC may include a prism array 20 and a diffracting element 30.

The spatial light modulator 10 may include an optical electrical device that is capable of varying a refractive index based on an electrical signal. The spatial light modulator 10 may include a photoelectric material such as a liquid crystal layer. The spatial light modulator 10 may vary a refractive index of the photoelectric material to control a phase of light when a voltage is applied thereto. For example, the spatial light modulator 10 may include a polymer-dispersed liquid crystal layer. The length of an optical path of light transmitted through the spatial light modulator may vary according to the voltage applied to the polymer-dispersed liquid crystal layer, and the phase of transmitted light may be modulated accordingly. Phase retardation may be generated according to characteristics of a photoelectric material layer used to vary a polarization direction. While not shown in FIG. 1, to correct the varied polarization direction, a phase plate and a polarization plate may be further included next to the spatial light modulator 10.

Figure 2A:
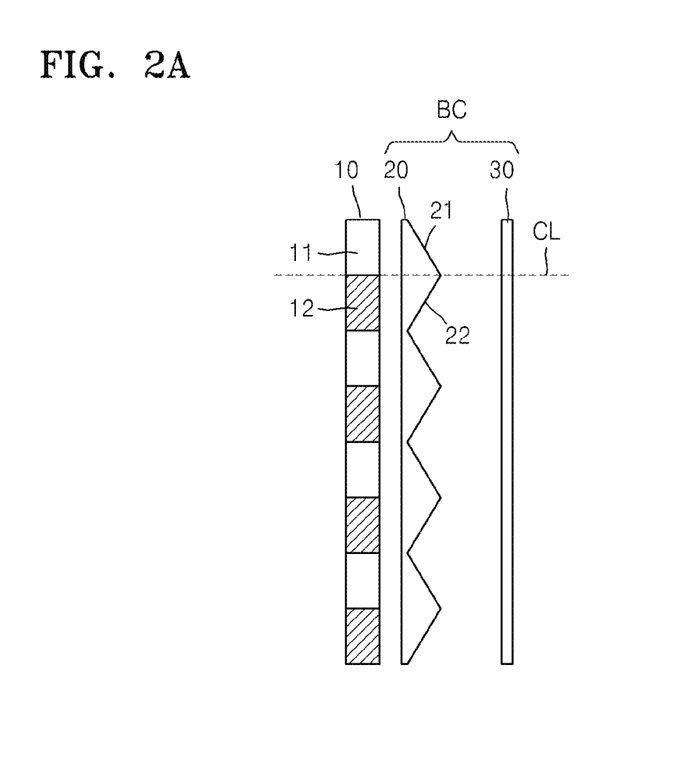
FIG. 2A is a front side view of a complex spatial light modulator according to an exemplary embodiment.
Figure 2B:
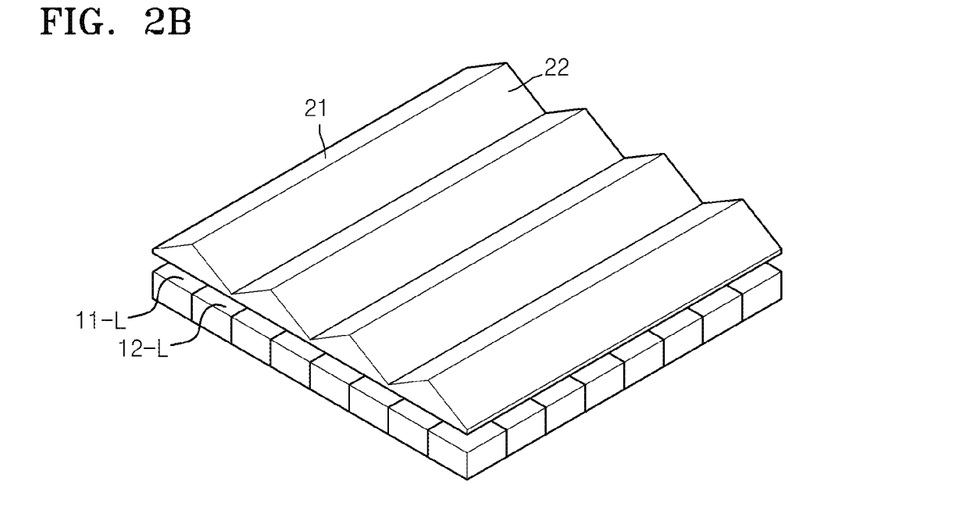
FIG. 2B is a perspective view of a complex spatial light modulator according to an exemplary embodiment.

FIG. 2A is a side view of the complex spatial light modulator 1. FIG. 2B is a perspective view of the complex spatial light modulator 1. As illustrated in FIGS. 2A and 2B, the spatial light modulator 10 may include a plurality of pixels 11 and 12. The plurality of pixels 11 and 12 may be arranged in, for example, a two-dimensional (2D) matrix. The prism array 20 may include a first prism surface 21 and a second prism surface 22. The first prism surface 21 and the second prism surface 22 may be symmetrically arranged with respect to a central line. The first prism surface 21 and the second prism surface 22 may be disposed to face each other at an angle, and for example, the first prism surface 21 and the second prism surface 22 may have the same gradient with respect to the central line CL. A prism unit may be included to correspond to the plurality of pixels that are included along two lines. The first prism surface 21 may correspond to pixels of the spatial light modulator 10 included along a first line 11-L, and the second prism surface 22 may correspond to pixels of the spatial light modulator included along a second line 12-L.

A beam that has passed through the prism array 20 is incident on the diffracting element 30. The diffracting element 30 may be, for example, a grating. The prism array 20 may have an arrangement in which the first prism surface 21, which refracts light in a first direction, and the second prism surface 22, which refracts light in a second direction, are alternately arranged. The first prism surface 21 and the second prism surface 22 of the prism array 20 may form a set, and the pixels of the two lines of the spatial light modulator 10 corresponding to the first prism surface 21 and the second prism surface 22 may form a set.

Figure 3:
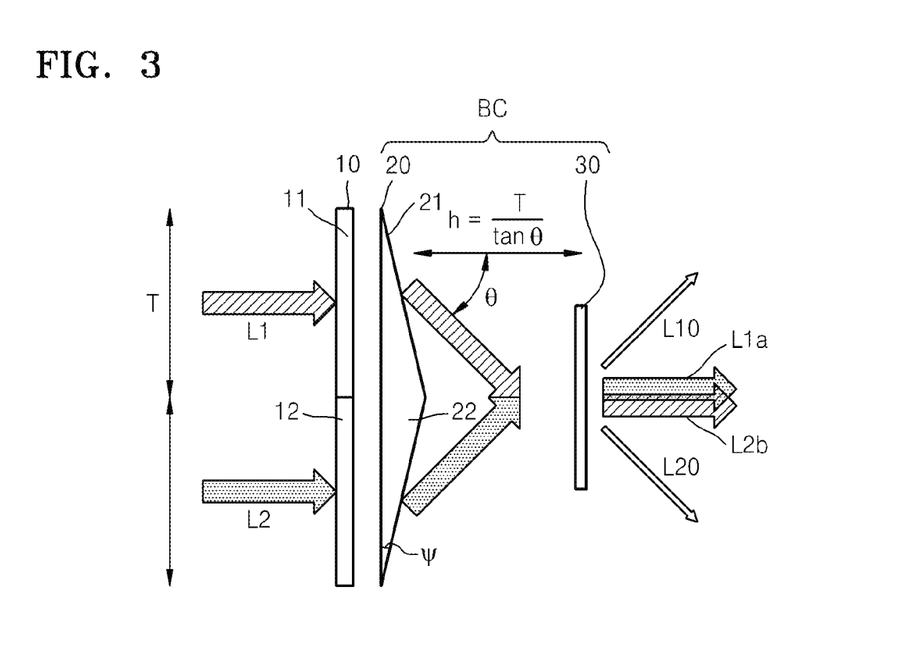
FIG. 3 is a view for explaining an operation of a complex spatial light modulator illustrated in FIG. 1 according to an exemplary embodiment.

FIG. 3 is a view for explaining an operation of the complex spatial light modulator 1 illustrated in FIG. 1 according to an exemplary embodiment. In the spatial light modulator 10, a first pixel 11 and a second pixel 12 may be in a pair, and first light L1 that has passed through the first pixel 11 and second light L2 that has passed through the second pixel 12 may be combined by using a beam combiner BC to modulate a phase and amplitude of light.

The first light L1 may be incident on the first prism surface 21 of the prism array 20 to be refracted at a predetermined angle, and the second light L2 may pass through the second prism surface 22 of the prism array 20. The first light L1 and the second light L2 are incident on the diffracting element 30 and diffracted by using the diffracting element 30.

Figure 7:
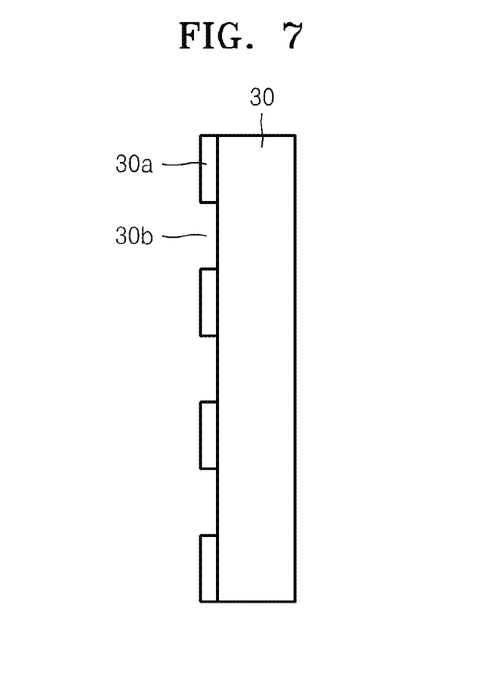

The diffracting element 30 may include, for example, a semiconductor diffractive element manufactured using a semiconductor manufacturing process to have a plurality of protrusions 30a and grooves 30b that are arranged at predetermined pitches, thus forming a relief shape on the surface of the diffracting element 30, as shown in FIG. 7. A diffraction angle of diffracted light may be adjusted according to intervals of the pitches of the diffracting element 30. Also, a diffraction efficiency may be adjusted by adjusting a depth of the plurality of grooves. Meanwhile, a diffraction efficiency of the diffracting element 30 may be varied according to a variation in the wavelength and incident angle of incident light. The diffracting element 30 may be designed to have a maximum diffraction efficiency with respect to the wavelength of light used and an incident angle of light that is incident on the diffracting element 30 through the prism array 20. Accordingly, a diffraction efficiency may be reduced with respect to light that has a wavelength and an incident angle not corresponding to the design conditions of the diffracting element 30. Accordingly, the diffracting element 30 may be designed to have a high diffraction efficiency with respect to the first light L1 and the second light L2 that have passed through the prism array 20.

A diffracting element as described above, and as illustrated in FIG. 7 is not limited in size, and can be manufactured to be very large. Additionally, because the diffracting element is a semiconductor diffractive grating, it is not polarization dependent and it provides multi-order diffraction, as discussed below.

For example, by using the diffracting element 30, the first light L1 may be diffracted to zero-order light and ±1 order light and the second light L2 may be diffracted to zero-order light and ±1 order light. The +1 order light L1a of the first light L1 and −1 order light L2b of the second light L2 proceed through the diffracting element 30. The +1 order light L1a of the first light L1 and −1 order light L2b of the second light L2 may be combined. As light beams that are respectively refracted at the first prism surface 21 and the second prism surface 22 are diffracted by using the diffracting element 30 in a direction horizontal to an optical axis, the light beams may be combined along a single optical axis to be formed as a coherent complex modulated light wave. Accordingly, a phase and amplitude of light may be modulated at the same time.

For example, when the first light L1 has a first phase φ1 by using the spatial modulator 10, and the second light L2 has a second phase φ2 by using the spatial modulator 10, and the first light L1 and the second light L2 are combined, they satisfy Equation 1 below.

$$\frac{1}{2}e^{i\phi_1(x,y)} + \frac{1}{2}e^{i\phi_2(x,y)} = \cos\left(\frac{\phi_1 - \phi_2}{2}\right)\exp\left[i\left(\frac{\phi_1 + \phi_2}{2}\right)\right] \quad \langle\text{Equation 1}\rangle$$

In Equation 1, a term cos on the righthand side is related to amplitude, and a term exp is related to a phase, and it is shown that when the first light L1 having a first phase and the second light L2 having a second phase are combined into a beam having one optical axis, phase and amplitude are modulated together. In the complex spatial light modulator illustrated in FIG. 1, light may be combined to a beam having one optical axis by using the prism array 20 and the diffracting element 30.

Referring to FIG. 3, an interval h between the prism array 20 and the diffracting element 30 may satisfy Equation 2 below.

$$h = T/\tan\theta \quad \langle\text{Equation 2}\rangle,$$

where h denotes an interval between the prism array 20 and the diffracting element 30, T denotes a pitch of pixels of a spatial light modulator 10, and θ denotes an incident angle of light that is incident to the diffracting element 30.

When a lattice period of the diffracting element 30 is Λ, the lattice period Λ may be calculated as in Equation 3 below.

$$\Lambda = \lambda/\sin\theta \quad \langle\text{Equation 3}\rangle,$$

where λ denotes a wavelength of first light L1 and second light L2.

Also, when a prism angle of the prism array 20 is Ψ (see FIG. 3), Ψ may satisfy Equation 4 below.

$$\psi = \sin^{-1}\left(\frac{1}{\sqrt{\left(\frac{n - \cos\theta}{\sin\theta}\right)^2 + 1}}\right) \quad \langle\text{Equation 4}\rangle$$

Here, n denotes a refractive index of the prism array.

A diffraction efficiency of the diffracting element 30 may be varied according to the wavelength and incident angle of incident light. The diffracting element 30 may be designed to have a maximum diffraction efficiency with respect to a wavelength of light used and an incident angle of light that is incident through the prism array 20. For example, the diffracting element 30 may be designed such the +1 order light L1a of the first light L1 and the −1 order light L2b of the second light L2 have higher diffraction efficiency than the first light L1 and the second light L2 that have passed through the prism array 20.

Figure 4:
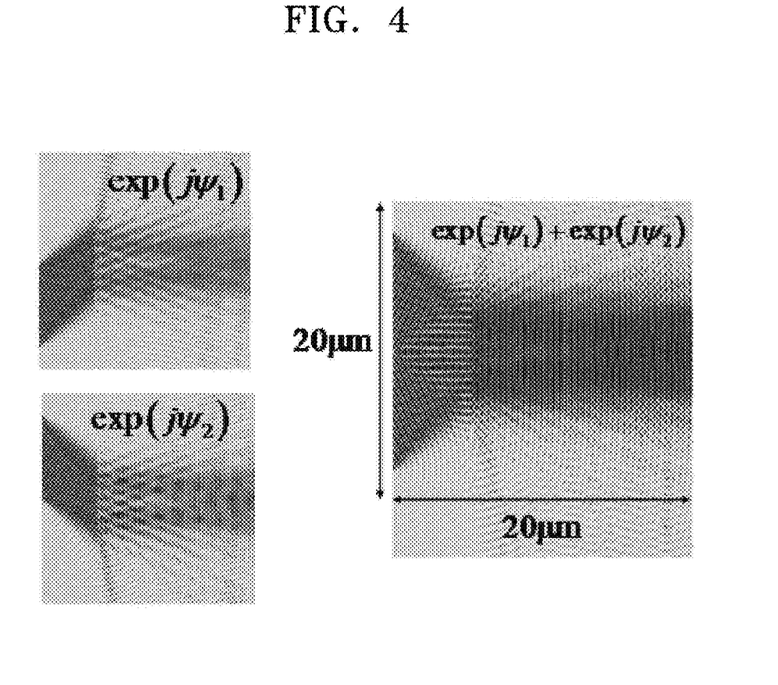
FIG. 4 is a photographic image of light that is combined by using a complex spatial modulator according to an exemplary embodiment.

FIG. 4 shows photographic images of light that is combined by using a complex spatial modulator according to an embodiment of the present inventive concept. This will be described in detail with reference to FIG. 5, which is a view for explaining light that is being combined in a complex spatial light modulator according to an embodiment of the present inventive concept.

Figure 5:
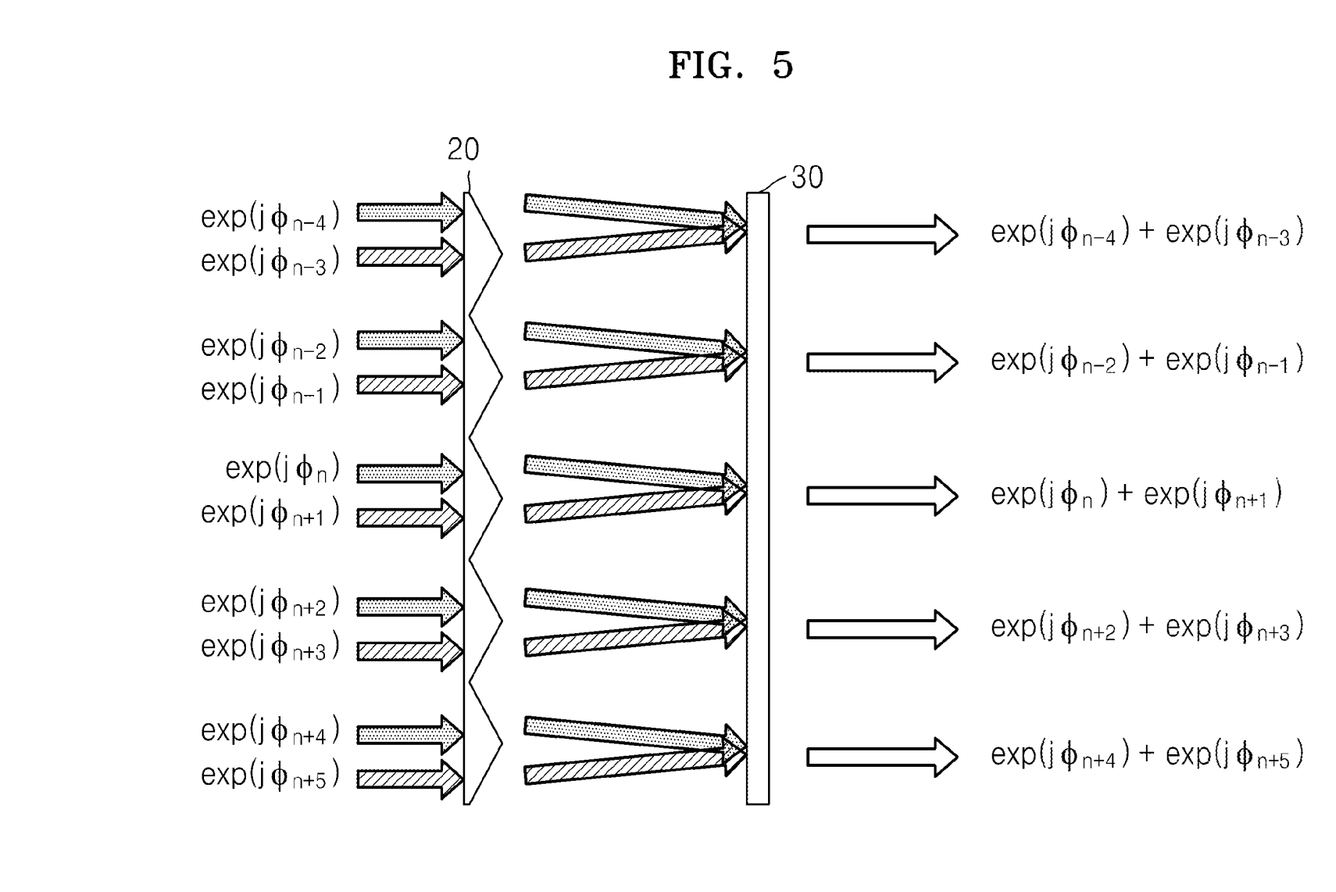
FIG. 5 is a view for explaining light that is being combined in a complex spatial light modulator according to an exemplary embodiment.

As illustrated in FIG. 5, (n−4)-th light having a phase (φn−4), (n−3)-th light having a phase (φn−3), (n−2)-th light having a phase (φn−2), (n−1)-th light having a phase (φn−1), n-th light having a phase φn, (n+1)-th light having a phase (φn+1), (n+2)-th light having a phase (φn+2), (n+3)-th light having a phase (φn+3), (n+4)-th light having a phase (φn+4), and (n+5)-th light having a phase (φn+5) may be incident on the prism array 20. Light that has passed through the prism array 20 may be superimposed and may interfere based on patting through the diffracting element 30, which modulates the amplitude and phase of the light as follows.

exp(iφn−4)+exp(iφn−3)=2 cos [{(φn−4)−(φn−3)}/2] exp[i{(φn−4)+(φn−3)}/2]

exp(iφn−2)+exp(iφn−1)=2 cos [{(φn−2)−(φn−1)}/2] exp[i{(φn−2)+(φn−1)}/2]

exp(iφn)+exp(iφn+1)=2 cos [{(φn)−(φn+1)}/2]exp[i{ (φn)+(φn+1)}/2]

$$\exp(i\phi n+2)+\exp(i\phi n+3)=2\cos[\{(\phi n+2)-(\phi n+3)\}/2]$$
$$\exp[i\{(\phi n+2)+(\phi n+3)\}/2]$$

$$\exp(i\phi n+4)+\exp(i\phi n+5)=2\cos[\{(\phi n+4)-(\phi n+5)\}/2]$$
$$\exp[i\{(\phi n+4)+(\phi n+5)\}/2]$$

As described above, according to exemplary embodiments, a phase of light may be modulated by spatial light modulation and both the amplitude and phase of light may be modulated by using a beam combiner. As phase and amplitude of light may be modulated together as in the above-described exemplary embodiment, degradation in image quality due to twin images or speckles may be prevented. Also, as a spatial light modulator and a beam combiner are arranged parallel to each other, optical alignment thereof is easy. In addition, a spatial light modulator and a beam combiner having a slim size may be manufactured and arranged, and thus, a slim complex spatial light modulator may be manufactured. Thus, the complex spatial light modulator may be applied to, for example, a flat panel display (FPD).

The complex spatial light modulator according to exemplary embodiments may be applied to a holographic 3D image display apparatus to display realistic 3D images.

Figure 6:
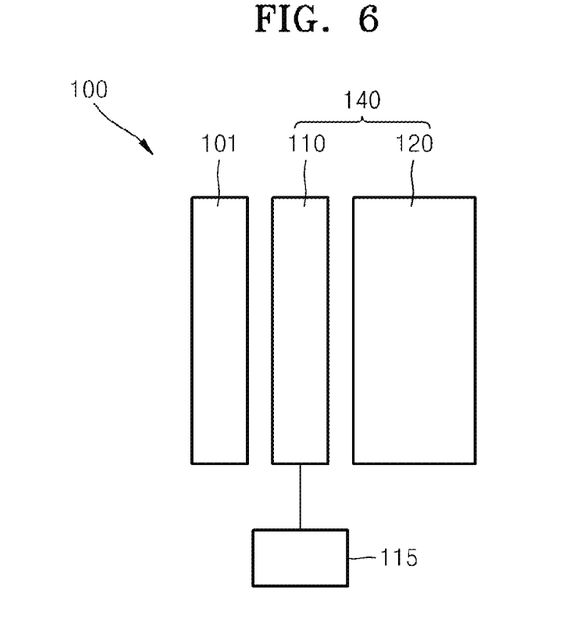
FIG. 6 is a schematic view of a three-dimensional (3D) image display apparatus according to an exemplary embodiment; and, FIG. 7 is a cross-sectional view of a semiconductor diffracting element according to an exemplary embodiment.

FIG. 6 is a schematic view of a three-dimensional (3D) image display apparatus 100 according to an exemplary embodiment.

The 3D image display apparatus 100 may include a light source unit 101 that emits light and a complex spatial light modulator 140 that displays a 3D image by using light emitted from the light source unit 101. The complex spatial light modulator 140 may include a spatial light modulator 110 that modulates a phase of light and a beam combiner 120 that combines the light beams emitted from the spatial light modulator 110 and modulates a phase and amplitude of the light. Also, an image signal circuit unit 115 that inputs a holographic image signal may be included in the spatial light modulator 140. As the complex spatial light modulator 140, the complex spatial light modulator described with reference to FIGS. 1 and 2 may be used. The complex spatial light modulator 140 may be manufactured to be slim, and may be used in a flat panel holographic 3D image display apparatus to provide 3D images having a high image quality.

A prism array used in the complex spatial light modulator according to exemplary embodiments may be easily manufactured to increase production efficiency.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A complex spatial light modulator comprising:
a spatial light modulator that modulates a phase of light transmitted therethrough;
a prism array comprising a plurality of prism units, each of the plurality of prism units comprising a first prism surface that is substantially planar and a second prism surface that is substantially planar, wherein light transmitted through the spatial light modulator is incident on the prism array; and
a polarization-independent diffracting element that diffracts light that has passed through the prism array.

2. The complex spatial light modulator of claim 1, wherein the first prism surface and the second prism surface are symmetrically arranged with respect to each other.

3. The complex spatial light modulator of claim 1, wherein a plurality of the first prism surfaces are disposed to face a plurality of pixels of a first line of the spatial light modulator, and a plurality of the second prism surfaces are disposed to face a plurality of pixels of a second line of the spatial light modulator.

4. The complex spatial light modulator of claim 1, wherein first light that is refracted by the first prism surface and second light that is refracted by the second prism surface are combined along a single optical axis when transmitted through the diffracting element.

5. The complex spatial light modulator of claim 1, wherein the first prism surface and the second prism surface are disposed to face each other, and the first prism surface and the second prism surface have the same gradient with respect to a central line between the first prism surface and the second prism surface.

6. The complex spatial light modulator of claim 1, wherein the diffracting element combines +1 order light that has been transmitted through the spatial light modulator and refracted by the first prism surface and −1 order light that has been transmitted through the spatial light modulator and refracted by the second prism surface.

7. The complex spatial light modulator of claim 1, wherein the spatial light modulator comprises a liquid crystal layer.

8. The complex spatial light modulator of claim 1, wherein a spacing between the prism array and the diffracting element satisfies a following equation:

$$h=T/\tan\theta,$$

where h is the spacing between the prism array and the diffracting element, T is a pitch of pixels of the spatial light modulator, and θ is an incident angle of light that is incident on the diffracting element.

9. The complex spatial light modulator of claim 1, wherein the diffracting element is a semiconductor diffracting element comprising an array of protrusions and grooves.

10. A three-dimensional (3D) image display apparatus comprising:
a light source unit that emits light;
an image signal circuit unit that inputs an image signal to a spatial light modulator
the spatial light modulator that modulates a phase of the light emitted from the light source unit, based on the image signal; and
a beam combiner that modulates a phase and an amplitude of light emitted from the spatial light modulator,
wherein the beam combiner comprises:
a prism array comprising a plurality of prism units, each of the prism units comprising a first prism surface that is substantially planar and a second prism surface that is substantially planar, wherein light emitted from the spatial light modulator is incident on the prism array; and
a polarization-independent diffracting element that diffracts light that has passed through the prism array.

11. The 3D image display apparatus of claim 10, wherein the first prism surface and the second prism surface are symmetrically arranged with respect to each other.

12. The 3D image display apparatus of claim 10, wherein a plurality of the first prism surfaces are disposed to face a plurality of pixels of a first line of the spatial light modulator, and a plurality of the second prism surfaces are disposed to face a plurality of pixels of a second line of the spatial light modulator.

13. The 3D image display apparatus of claim 10, wherein first light that is refracted by the first prism surface and second light that is refracted by the second prism surface are combined along a single optical axis when transmitted through the diffracting element.

14. The 3D image display apparatus of claim 10, wherein the first prism surface and the second prism surface are disposed to face each other, and the first prism surface and the second prism surface have the same gradient with respect to a central line between the first prism surface and the second prism surface.

15. The 3D image display apparatus of claim 10, wherein the diffracting element combines +1 order light that has been transmitted through the spatial light modulator and refracted by the first prism surface and −1 order light that has been transmitted through the spatial light modulator and refracted by the second prism surface.

16. The 3D image display apparatus of claim 10, wherein the spatial light modulator comprises a liquid crystal layer.

17. The 3D image display apparatus of claim 10, wherein a spacing between the prism array and the diffracting element satisfies a following equation:

$$h = T/\tan \theta,$$

where h is the spacing between the prism array and the diffracting element, T is a pitch of pixels of the spatial light modulator, and θ is an incident angle of light that is incident on the diffracting element.

18. The 3D image display apparatus of claim 10, wherein the diffracting element is a semiconductor diffracting element comprising an array of protrusions and grooves.

19. A complex spatial light modulator comprising:
   a spatial light modulator that modulates a phase of light transmitted therethrough;
   a prism array comprising an array of a plurality of prism units, wherein light from the spatial light modulator is incident on the prism array; and
   a semiconductor diffracting element comprising an array of protrusions and grooves, wherein, for each of the plurality of prism units, the diffracting element combines light transmitted through a first prism surface and light transmitted through a second prism surface to travel on a single optical axis.

20. A three-dimensional (3D) image display apparatus, comprising:
   a light source unit that emits light;
   a spatial light modulator that modulates a phase of light transmitted therethrough;
   a prism array comprising an array of a plurality of prism units, wherein light from the spatial light modulator is incident on the prism array; and
   a semiconductor diffracting element comprising an array of protrusions and grooves, wherein, for each of the plurality of prism units, the diffracting element combines light transmitted through a first prism surface and light transmitted through a second prism surface to travel on a single optical axis.

* * * * *